(12) United States Patent
Achour

(10) Patent No.: US 12,007,473 B2
(45) Date of Patent: Jun. 11, 2024

(54) SOUNDING SIGNAL FOR OBJECT DETECTION IN A RADAR SYSTEM

(71) Applicant: BDCM A2 LLC, Dover, DE (US)

(72) Inventor: Maha Achour, Encinitas, CA (US)

(73) Assignee: BDCM A2 LLC, Dover, DE (US)

( * ) Notice: Subject to any disclaimer, the term of this patent is extended or adjusted under 35 U.S.C. 154(b) by 0 days.

(21) Appl. No.: 18/097,925

(22) Filed: Jan. 17, 2023

(65) Prior Publication Data

US 2023/0161031 A1 May 25, 2023

Related U.S. Application Data

(63) Continuation of application No. 16/542,851, filed on Aug. 16, 2019, now Pat. No. 11,555,918.

(60) Provisional application No. 62/765,178, filed on Aug. 17, 2018.

(51) Int. Cl.
*G01S 13/931* (2020.01)
*G01S 13/02* (2006.01)
*H01Q 3/24* (2006.01)

(52) U.S. Cl.
CPC ............ *G01S 13/931* (2013.01); *G01S 13/02* (2013.01); *H01Q 3/245* (2013.01); *G01S 2013/0245* (2013.01); *G01S 2013/9316* (2020.01)

(58) Field of Classification Search
None
See application file for complete search history.

(56) References Cited

U.S. PATENT DOCUMENTS

| 6,492,949 | B1 | 12/2002 | Breglia et al. |
| 7,928,900 | B2 | 4/2011 | Fuller et al. |
| 10,205,457 | B1* | 2/2019 | Josefsberg ............... H03L 7/091 |
| 2011/0175789 | A1 | 7/2011 | Lee et al. |
| 2013/0241765 | A1 | 9/2013 | Kozma et al. |
| 2016/0135694 | A1 | 5/2016 | van Dorp |
| 2017/0160392 | A1 | 6/2017 | Brisimitzakis et al. |
| 2018/0113195 | A1* | 4/2018 | Bialer ..................... G01S 13/86 |

(Continued)

OTHER PUBLICATIONS

L. Danielsson, "Tracking and Radar Sensor Modelling for Automotive Safety Systems," Thesis for the Degree of Doctor of Philosopie, Department of Signals and Systems, Signal Processing Group, Chalmers University of Technology, Göteborg, Sweden, pp. 1-102, 2010.

(Continued)

*Primary Examiner* — Whitney Moore
(74) *Attorney, Agent, or Firm* — Dinsmore & Shohl LLP

(57) ABSTRACT

Examples disclosed herein relate to an antenna system in a radar system for object detection with a sounding signal. The antenna system includes a radiating array of elements configured to transmit a reference signal and an antenna controller coupled to the radiating array of elements. The antenna controller is configured to detect a set of reflections of the reference signal from an object. The antenna is configured to determine a location of the object and a mobility status from the set of reflections. The antenna controller is also configured to generate signaling indicating the location and mobility status of the object as output to identify a target object different from the object. Other examples disclosed herein relate to a radar system and a method of object detection with the radar system.

19 Claims, 12 Drawing Sheets

(56) References Cited

U.S. PATENT DOCUMENTS

2019/0179023 A1 6/2019 Englard et al.
2020/0011970 A1* 1/2020 Abari .................. G01S 13/931

OTHER PUBLICATIONS

F. B. Ramian, "Automotive Radar Imaging Using Non-coherent Sensors," Ph. D. dissertation, Technische Universität München, pp. 1-98, Sep. 15, 2005.

Moon-Sik Lee et al., System Modeling and Signal Processing for a Switch Antenna Array Radar, IEEE Transactions on Signal Processing, vol. 52, No. 6, pp. 1-11, Jun. 2004.

F. Bu et al., "Pedestrian Detection in Transit Bus Application: Sensing Technologies and Safety Solutions," IEEE Proceedings, Intelligent Vehicles Symposium, Las Vegas, NV, pp. 100-105, Jun. 2005.

S. Patole et al., "Automotive Radars: A Review of Signal Processing Techniques," Signal Processing for Smart Vehicle Technologies: Part 2, in IEEE Signal Processing Magazine, pp. 22-35, Mar. 2017.

S.-H. Jeong, et. al., "A Multi-Beam and Multi-Range Radar With FMCW and Digital Beam Forming for Automotive Applications," Progress in Electromagnetics Research, vol. 124, pp. 285-299, 2012.

S. Carpenter, "Autonomous Vehicle Radar: Improving Radar Performance with Simulation," White Paper, High Frequency/Electronics Business Unit, ANSYS, Canonsburg, PA, pp. 1-14, 2017.

S. Milch et al., "Pedestrian Detection with Radar and Computer Vision," Smart Microwave Sensors GmbH, Braunschweig, Germany, pp. 1-7, 2001.

Mahmoud Khodjet-Kesba, "Automatic target classification based on radar backscattered ultra wide band signals," University Blaise Pacsal, pp. 1-161, May 2016.

M. Steinhauer et al., "Millimeter-Wave-Radar Sensor Based on a Transceiver Array for Automotive Applications," IEEE Transactions on Microwave Theory and Techniques, vol. 56, No. 2, pp. 1-9, Feb. 2008.

Pavlo Molchanov, "Radar target classification by micro-Doppler contributions," Tampere University of Technology, pp. 1-208, 2014.

* cited by examiner

SOUNDING SIGNAL FOR OBJECT DETECTION IN A RADAR SYSTEM

CROSS-REFERENCE TO RELATED APPLICATIONS

This application claims priority from U.S. Non-Provisional Application Ser. No. 16/542,851, filed on Aug. 16, 2019, and incorporated by reference in its entirety; and claims priority from U.S. Provisional Application No. 62/765,178, filed on Aug. 17, 2018, and incorporated by reference in its entirety.

BACKGROUND

Wireless communications are used in an ever-expanding range of products with efficiency requirements. In a wireless transmission system, such as radar or cellular communications, the size of the antenna is determined by the transmission characteristics. With the widespread application of wireless applications, the footprint and other parameters allocated for a given antenna, or radiating structure, are constrained. In addition, the demands on the capabilities of the antenna continue to increase, such as, among others, increased bandwidth, finer control, and increased range. In these applications, there is a desire to reduce the power consumption, spatial footprint and computing power for operation of the antenna and transmission structure.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
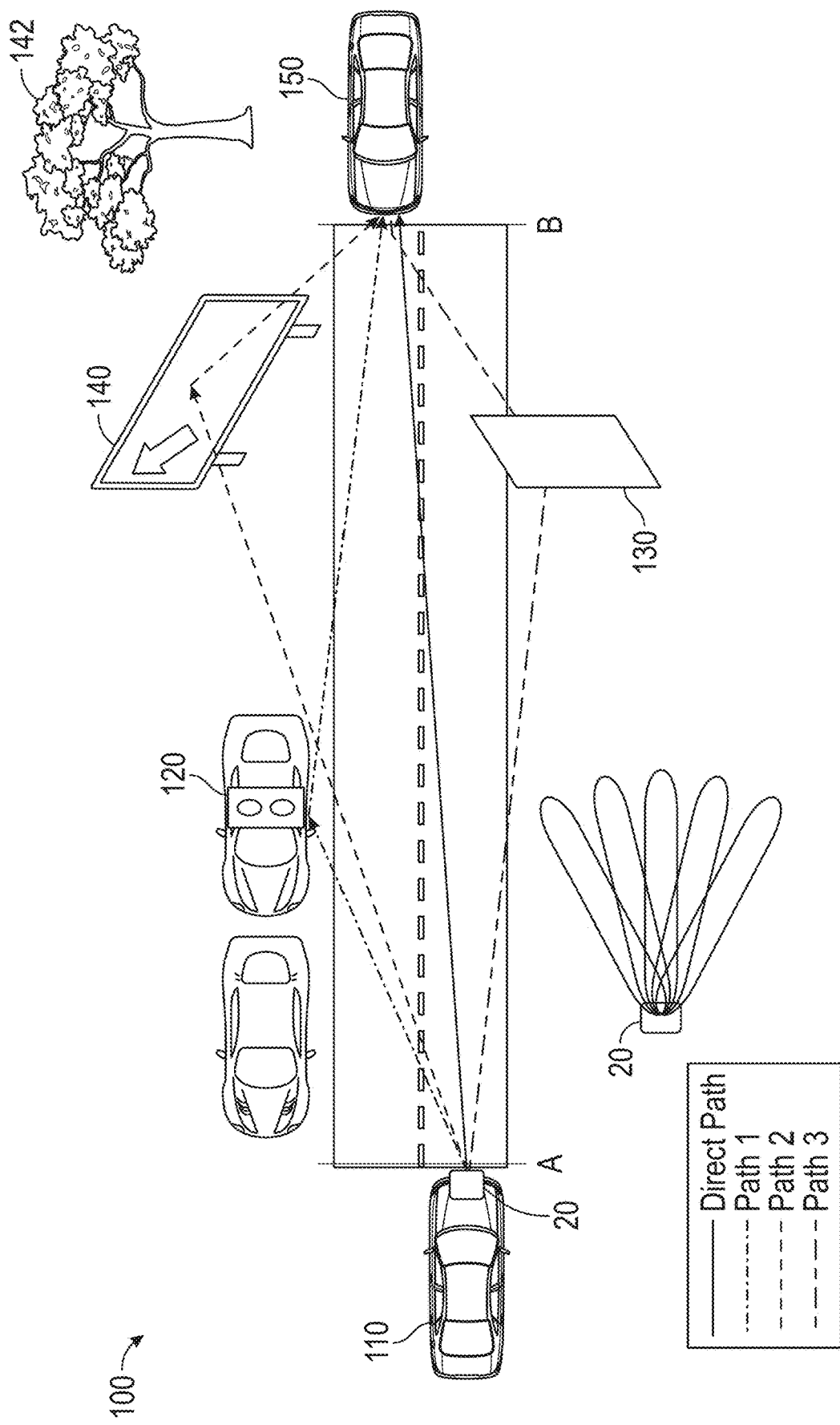
FIG. 1 illustrates an environment having a vehicle with a radar system, according to various implementations of the subject technology.

The present disclosure provides wireless systems and radar systems where information is transmitted via electromagnetic waves for communication and object detection. In current systems the various scanning scenarios have very tight timing requirements, which impact the scan range, the post-processing, and the control of the antenna(s). The speed and data throughput for applications such as autonomous vehicles and 5G communications and their future developments demand microsecond responses, and these requirements will reduce dramatically with expansion of these use cases.

For example, in an autonomous vehicle a main controller, or sensor fusion, is used to receive multiple type signals and information and then determine a next state and action for the vehicle. The sensor fusion is designed to capture data on a fast-moving vehicle. The present disclosure provides methods and apparatuses to receive this information and generate an understanding of the environment, and in some applications may be used to produce a three-dimensional (3D) point cloud representation. Radar is used to identify object locations and velocities, and may be used to identify acceleration, reflectivity and other characteristics. The present disclosure identifies stationary obstacles in an environment and builds a landscape that the sensor fusion may track against as the vehicle moves, reducing the processing time and taking advantage of non-line of sight capacities available in these methods and apparatuses.

The information received gives an instantaneous reconstruction of the moving obstacles and infrastructure. In some applications, the sensor fusion accesses global positioning information, such as Global Positioning System (GPS) information, and uses this information to guide a vehicle. This instantaneous information is critical in autonomous vehicles for safe operation.

The present disclosure provides for signaling, such as a sounding signal, to locate and discriminate stationary objects from mobile objects. This is similar to the sounding signal in a cellular system, where the system obtains channel information to set up and maintain a call from a transmission point to multiple antennas; in the present disclosure, and claims depending thereon.

In some implementations, a radar system steers a highly-directive Radio Frequency (RF) beam that serves as the sounding signal and can accurately determine the location and speed of road objects. The subject technology is not prohibited by weather conditions or clutter in an environment. The subject technology uses radar to provide information for two-dimensional (2D) image capability as they measure range and azimuth angle, providing distance to an object and azimuth angle identifying a projected location on a horizontal plane, respectively, without the use of traditional large antenna elements.

The subject technology is applicable in wireless communication and radar applications, and in particular those incorporating meta-structures capable of manipulating electromagnetic waves using engineered radiating structures. For example, the present disclosure provides for antenna structures having meta-structure elements and arrays. A meta-structure (MTS), as generally defined herein, is an engineered, non- or semi-periodic structure that is spatially distributed to meet a specific phase and frequency distribution. In some implementations, the meta-structures include metamaterials such as metamaterial cells or elements. There are structures and configurations within a feed network to the metamaterial elements that increase performance of the antenna structures in many applications, including vehicular radar modules. Additionally, the present disclosures provide methods and apparatuses for generating wireless signals, such as radar signals having improved directivity and reduced undesired radiation patterns aspects, such as side lobes. The present disclosure provides antennas with unprecedented capability of generating RF waves for radar systems. The present disclosure provides improved sensor capability and support autonomous driving by providing one of the sensors used for object detection. The present disclosure is not limited to these applications and may be readily employed in other antenna applications, such as wireless communications, 5G cellular, fixed wireless and so forth.

The subject technology relates to smart active antennas with unprecedented capability of manipulating RF waves to scan an entire environment in a fraction of the time of current systems. The subject technology also relates to smart beam steering and beam forming using MTS radiating structures in a variety of configurations, in which electrical changes to the antenna are used to achieve phase shifting and adjustment reducing the complexity and processing time and enabling fast scans of up to approximately 360° field of view for long range object detection.

The present disclosure provides for methods and apparatuses for radiating structures, such as for radar and cellular antennas, and provides enhanced phase shifting of the transmitted signal to achieve transmission in the autonomous vehicle communication and detection spectrum, which in the US is approximately 77 GHz and has a 5 GHz range, specifically, 76 GHz to 81 GHz, to reduce the computational complexity of the system, and to increase the transmission speed. The present disclosure accomplishes these goals by taking advantage of the properties of hexagonal structures coupled with novel feed structures. In some implementations, the present disclosure accomplishes these goals by taking advantage of the properties of MTS elements coupled with novel feed structures.

The subject technology supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to be 250 meters or more, such as to detect approaching cars on a highway. The present disclosure provides for automotive radar sensors capable of reconstructing the world around them and are effectively a radar "digital eye," having true 3D vision and capable of human-like interpretation of the world.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 conceptually illustrates a radar system 20, according to various implementations of the subject technology. In an example implementation illustrated in FIG. 1, an environment 100 is a roadway with moving vehicles and stationary objects. The vehicle 110 includes the radar system 20 positioned to detect objects in its path in environment 100. There are several objects positioned therein, including a parked police car 120 on the opposite side of the road, a road sign 140, and a billboard 130. There is also another vehicle 150 approaching vehicle 110. The environment includes some stationary objects, such as a tree 142 and a traffic sign 140. The billboard 130 may be a stationary structure or may be a mobile structure. Similarly, the police vehicle 120 is stopped and may be considered a stationary object for the time period of interest, specifically, while the car moves from point A to point B. While there may be various target objects, those in the path of the vehicle 110 are the targets of interests, referred to herein as "targets."

In identifying targets an ideal system will distinguish targets from non-targets, referred to herein as "clutter." Clutter includes objects that are not in the direct path, or anticipated path, of the vehicle, such as self-interference, jamming interference, objects, buildings, structures, and so forth. Self-interference includes signals that originate with radar system 20 and then are reflected or bounce off of objects. When a radar beam is transmitted over the air, the strength or gain of the signal at interaction, the angle at which the signal arrives, the reflectivity of the object, the shape of the object, and other parameters are useful for differentiating between targets and non-targets. When there are many objects in the environment, the radar system 20 detects each one's location and velocity. In some implementations, a specific transmission signal, such as a Frequency Modulated Continuous Wave (FMCW) signal, is used, such as a sawtooth wave, or a triangular wave.

The radar system 20 includes a transmit module with a transmit antenna, in which the transmit module is identified as Tx. The radar system 20 also includes a receive module with a receive antenna, in which the receive module is identified as Rx. The transmit and receive modules may be configured in a single module or distributed among multiple modules. In some implementations, portions of the transmit and receive chains within the transmit and receive modules, respectively, are shared. In some implementations, the transmit and receive antennas are separate portions of a similar antenna, such as subarrays within an array of radiating elements. The transmit antenna transmits a radiating signal at a transmit angle, in which the transmitted radiating signal has a main lobe and side lobes. Each side lobe of the transmitted radiated signal may have a corresponding directional angle measured from a boresight position as a reference.

The radar system 20 may transmit beams in a variety of directions, as illustrated. The transmitted beams are reflected from objects, wherein the reflections are received at different times. Direct reflections from a target object, such as from vehicle 150, are identified by solid lines. Other reflections bounce off a first point toward a second point, such as to the target vehicle 150. Each of these incurs additional time for return of the reflection to the radar system 20. Using these time relationships, the present disclosures enable non-line of sight object detection using the environmental information. The environment of FIG. 1 is provided for clarity of understanding, and additional environments will be provided herein.

Figure 2:
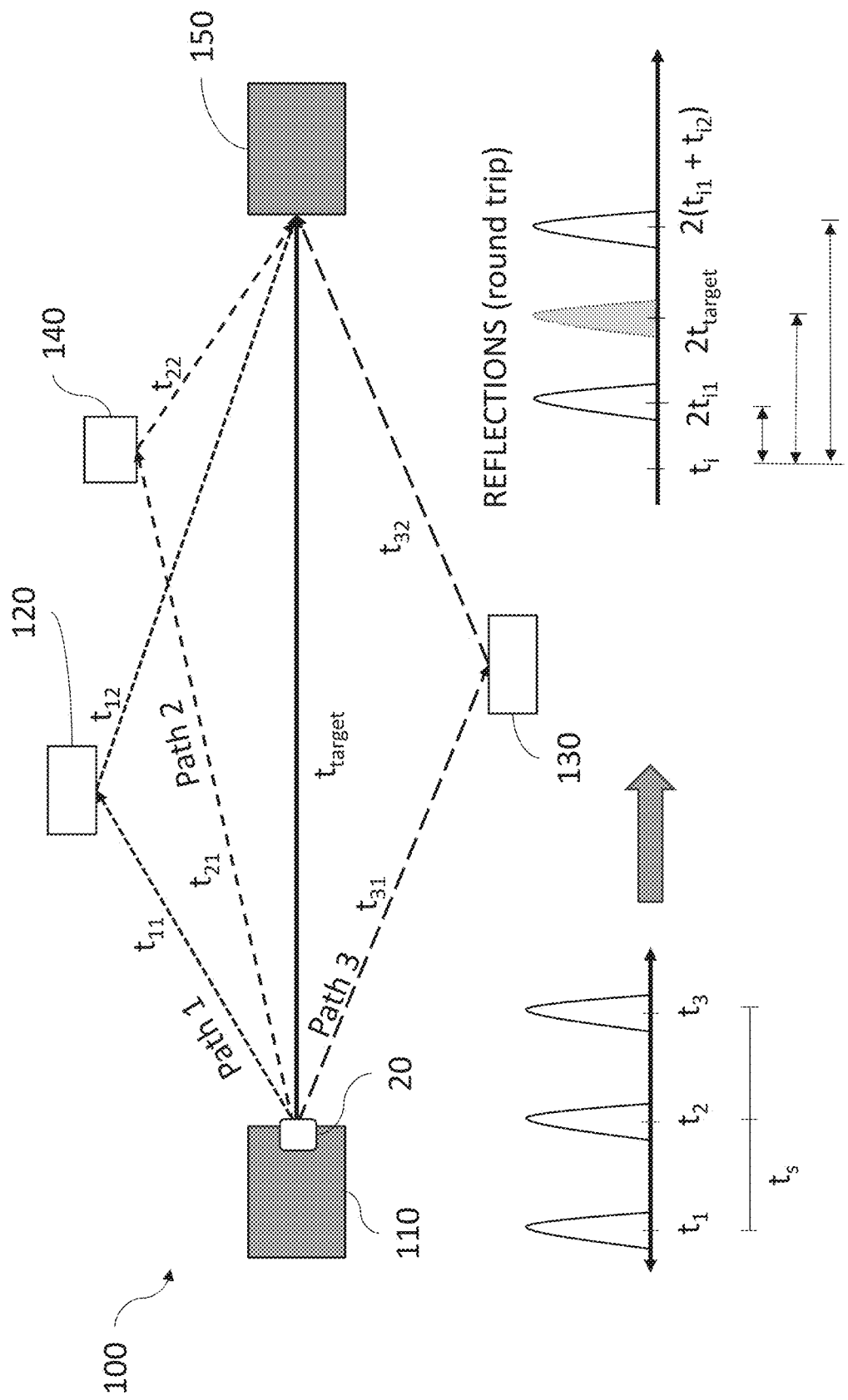
FIGS. 2-6 illustrate operation of a radar system as in FIG. 1, according to various implementations of the subject technology.

FIG. 2 illustrates the relationships between the various objects, where a first path from vehicle 110 deflects off object 120 to a target object (e.g., the vehicle 150) from which the signal is reflected and returns to vehicle 110 by the same path. A second path deflects off object 130 and a third path deflects off object 140. As the vehicle 150 continues to travel towards vehicle 110, signals from the stationary environmental objects assist in tracking location and velocity.

The time for the signal to travel on a given path is indicated with subscript representing (path, section), or (i,j). The signal times for each path are then compared to the direct path from the radar system 20 to the target object (e.g., the vehicle 150).

As given, the transmission time from the radar system 20 to the target object (e.g., the vehicle 150) is $t_{target}$, and the roundtrip time is $2*t_{target}$. The various times for the signal to traverse each path is different than the time to the target object, in which the measure of time is given for each path segment as $t_{ij}$ and the roundtrip time as $2*(t_{ij1}+t_{ij2})$.

Figure 3:
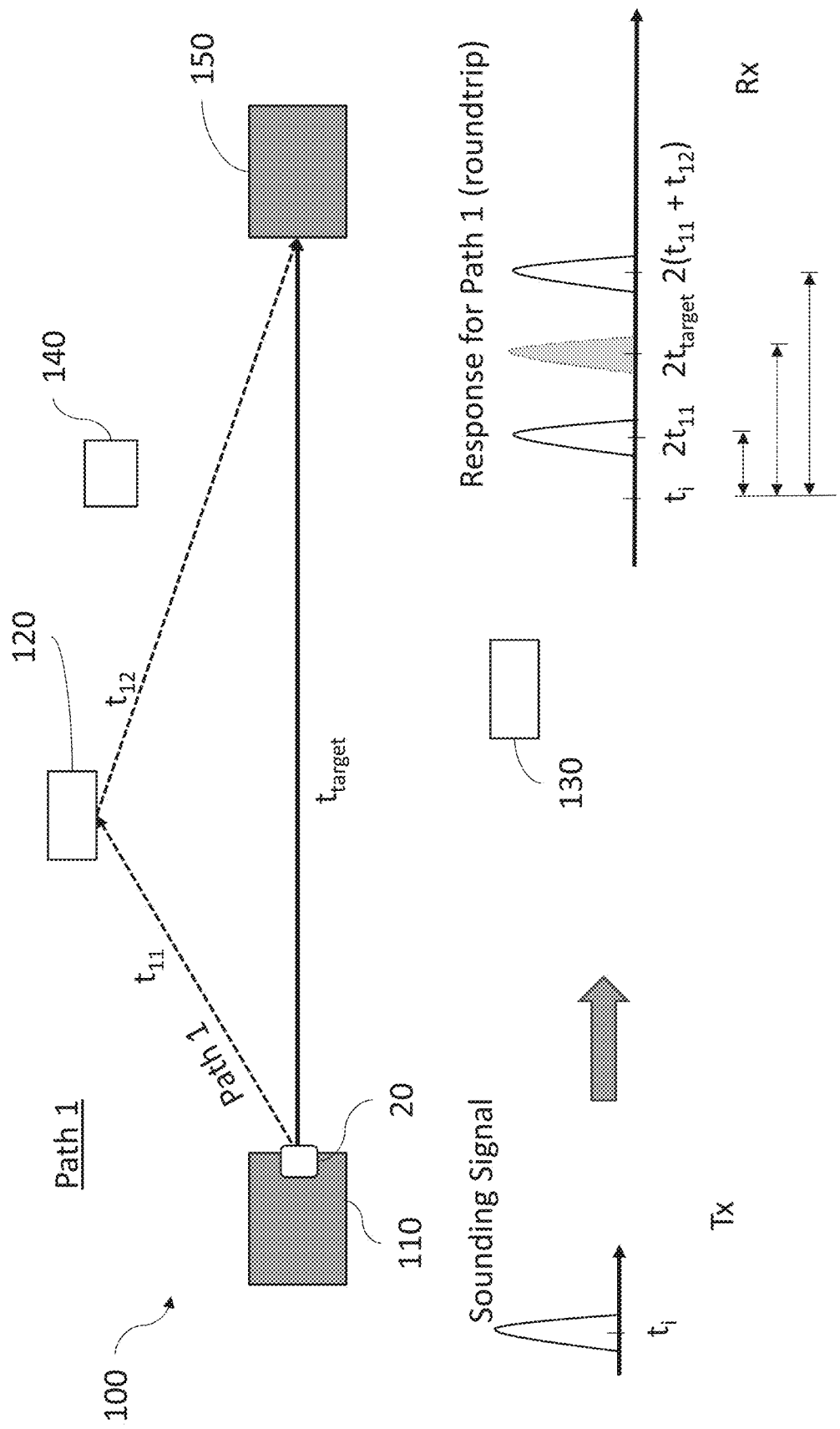
Figure 4:
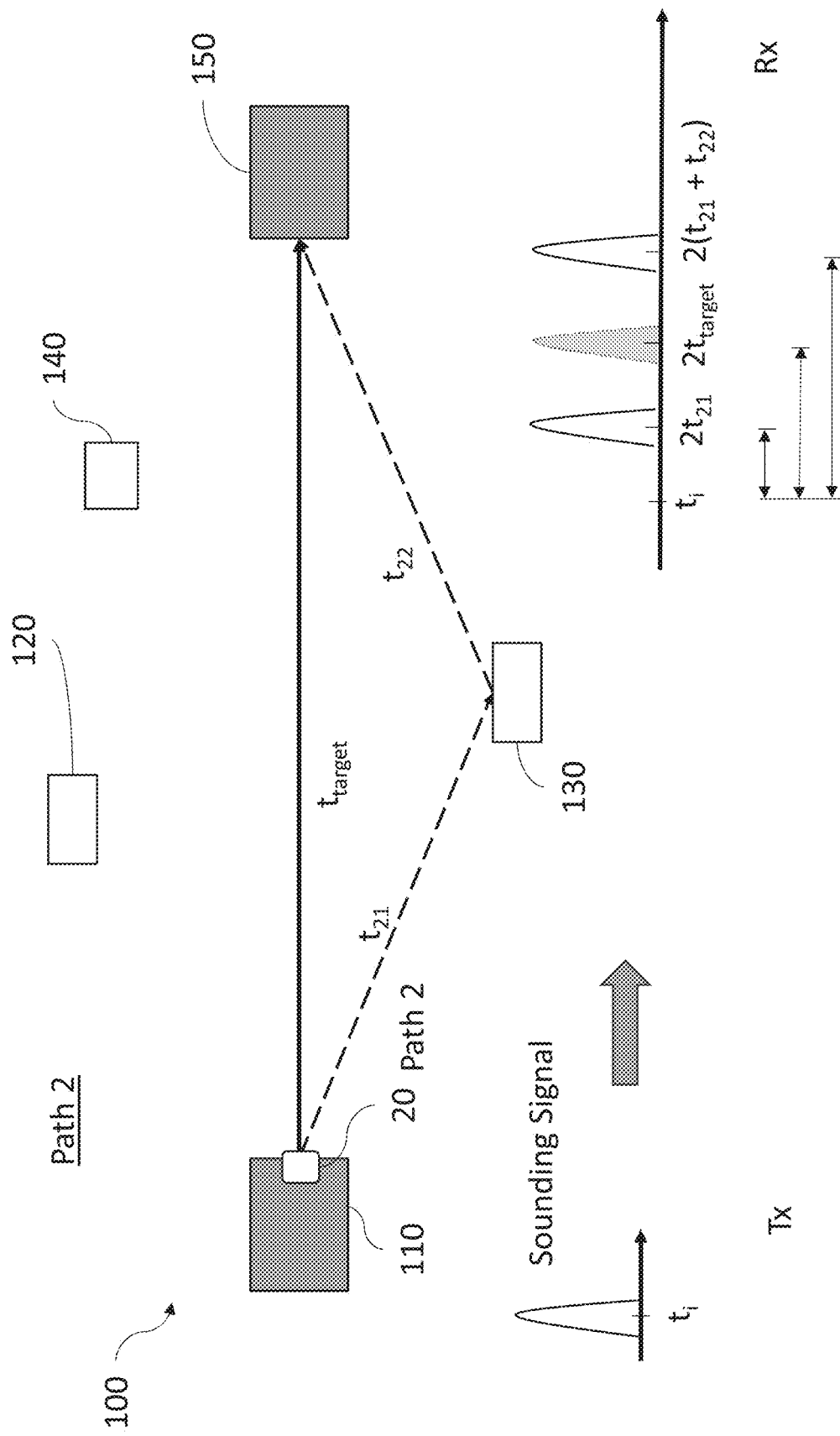
Figure 5:
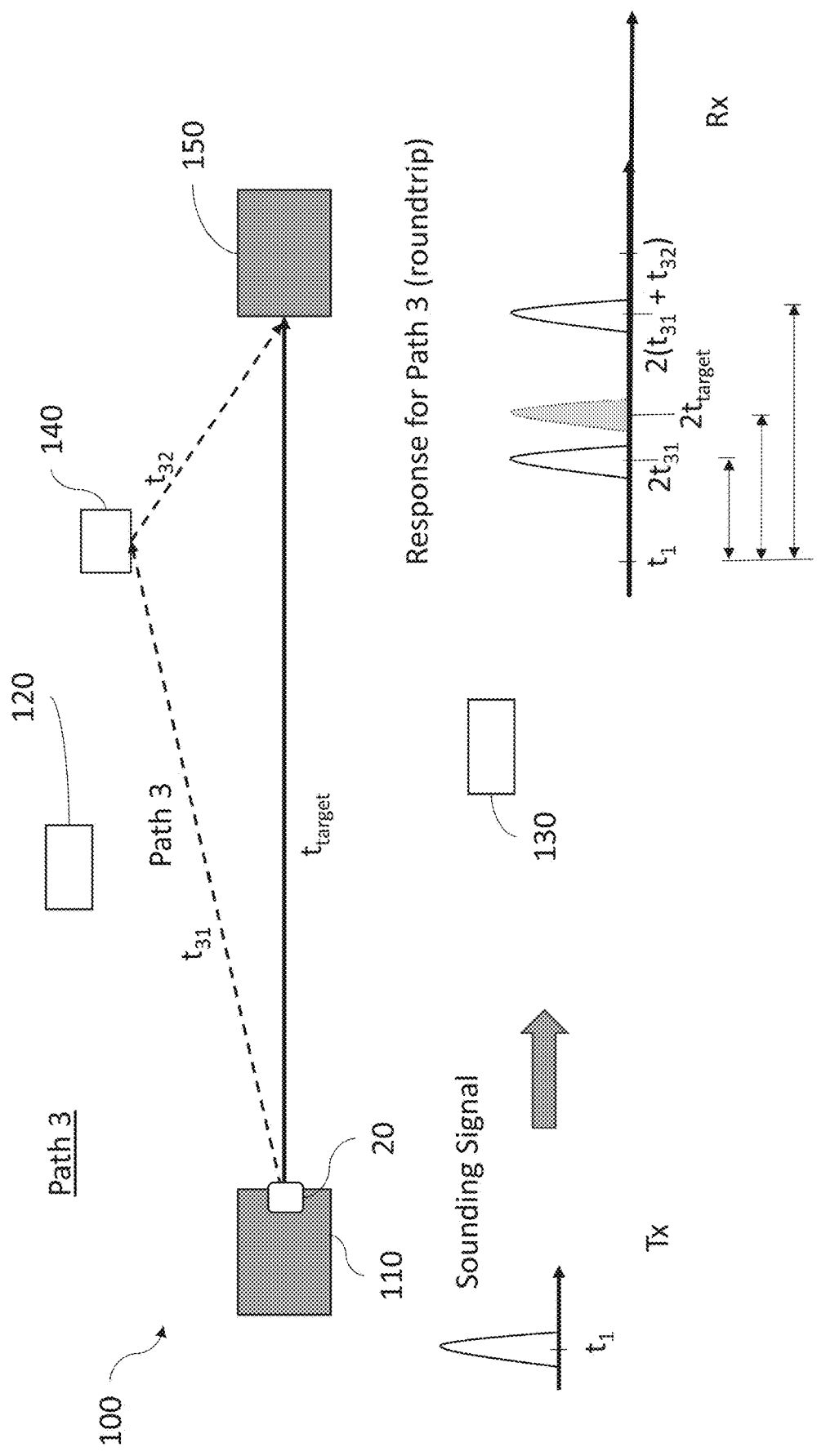

FIGS. 3-5 illustrate the travel time of paths 1, 2 and 3 and the timing associated therewith. As illustrated, in FIG. 3, a first path from vehicle 110 deflects off object 120 to a target object (e.g., the vehicle 150) from which the signal is reflected and returns to vehicle 110 by the same path. The round trip time from radar system 20 to the first section of path 1, $2*t_{11}$, is less than the round trip of the direct path, $t_{target}$, while the total path 1 round trip, $2*(t_{11}+t_{12})$ is greater than either $2*t_{11}$ or $2*t_{target}$. As illustrated, in FIG. 4, a second path deflects off object 130. The round trip time from radar system 20 to the first section of path 2, $2*t_{21}$, is less than the round trip time of the direct path, $t_{target}$, while the total path 2 round trip time, $2*(t_{21}+t_{22})$ is greater than either $2*t_{21}$ or $2*t_{target}$. As illustrated, in FIG. 5, a third path deflects off object 140. The round trip time from radar system 20 to the first section of path 3, $2*t_3$, is less than the round trip time of the direct path, $t_{target}$, while the total path 3 round trip time, $2*(t_{31}+t_{32})$ is greater than either $2*t_{31}$ or $2*t_{target}$.

Figure 6:
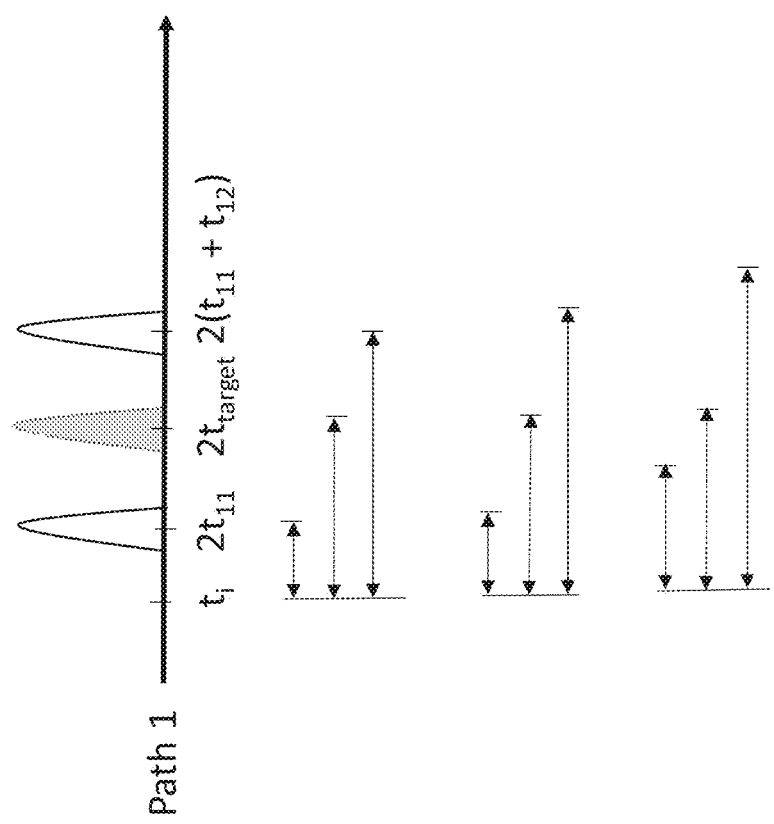

FIG. 6 illustrates a comparison of a sounding signal as received at the radar system 20 from each of the three paths. The different paths illustrated show the impact of the various obstacles in the path of the vehicle. The present disclosure enables the vehicle to distinguish stationary and mobile objects in real-time reducing the processing time required and improving responsiveness of the sensor fusion. Such time is critical in driver assist functions, such as an Advanced Driver Assistance System (ADAS) or autonomous vehicle control, as the vehicle control must respond in time to avoid collision, damage or other unexpected situations.

Figure 7:
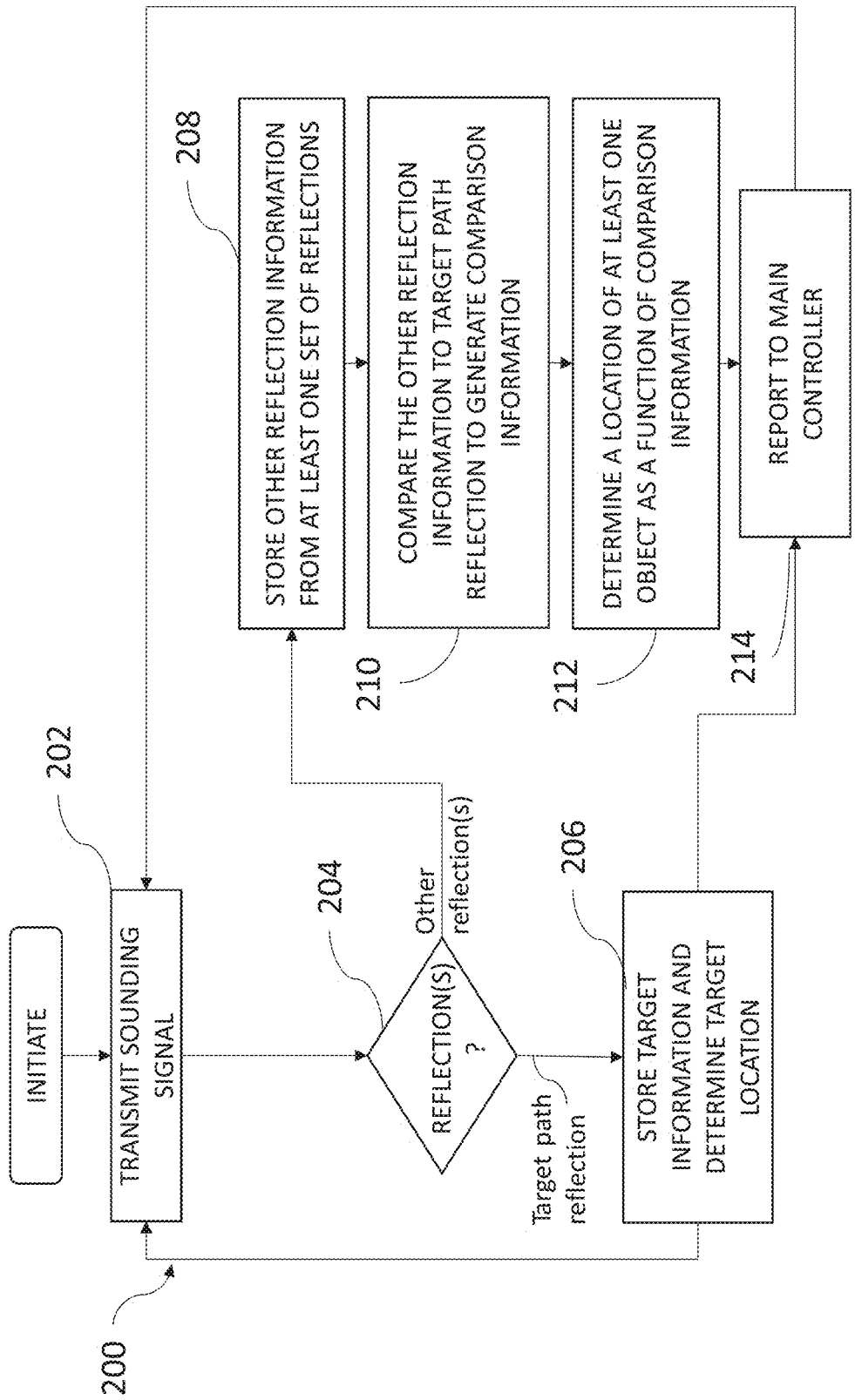
FIG. 7 illustrates a process for operating a radar system, according to various implementations of the subject technology.

FIG. 7 illustrates a process 200 for operating a radar system, according to various implementations of the subject technology. The process 200 incorporates a sounding signal to identify stationary and mobile objects. For explanatory purposes, the example process 200 is primarily described herein with reference to the radar system 20 of FIG. 1; however, the example process 200 is not limited to the radar system 20 of FIG. 1, and the example process 200 can be performed by one or more other components of the radar system 20 of FIG. 1. Further for explanatory purposes, the blocks of the example process 200 are described herein as occurring in series, or linearly. However, multiple blocks of the example process 200 can occur in parallel. In addition, the blocks of the example process 200 can be performed in a different order than the order shown and/or one or more of the blocks of the example process 200 may not be performed.

The process 200 begins at step 202, where the radar system 20 transmits a sounding signal. Next, at step 204, the radar system 20 receives reflections from an object. For example, the reflections may represent returning signals that are a delayed version of the transmitted sounding signal. At step 204, the radar system 20 determines whether the received reflections are a target path reflection or another type of reflection. If the reflections are along the target path, process 200 proceeds to step 206 where the target information is stored and used to determine the target location and velocity. Otherwise, the process proceeds to step 208. In some aspects, the target path is the direct path of the vehicle, which may not be a straight line, but is meant to consider the planned path of the vehicle.

If an object is within the direct path, there is a need to take an immediate action, even if that action is not to change course. In this respect, the process 200 proceeds to step 214 from step 206, where the target information is provided to a main controller, which interfaces with a sensor fusion or other main controller in the vehicle.

Where the reflections are from other directions, the process 200 proceeds to step 208, where processing continues to store the reflection information from at least one set of reflections. The set of reflections occurs such as illustrated by paths 1, 2 and 3 of FIG. 1, as the signal first reflects back to the radar system 20 from the object, such as object 120, and then also is redirected to the target object 150, or another object, and then returns to radar system 20 through the same approximate path. Therefore, for signals that intersect with the object 120, there are two reflection times, $2*t_1$ and $2*(t_{11}+t_{12})$. This time difference is used to determine a distance and reference location between the object 120 and the target object 150.

Subsequently, at step 210, the reflection set information is stored and compared to the target path reflection to generate comparison information. Next, at step 212, the radar system 20 determines a location of at least one object as a function of the comparison information. Subsequently, at step 214, this information is then reported to the main controller. In this way, the sounding signal is used to build a landscape for the vehicle in real time. As the vehicle moves forward, the stationary positions are known and may be considered as known, static entities.

Figure 8:
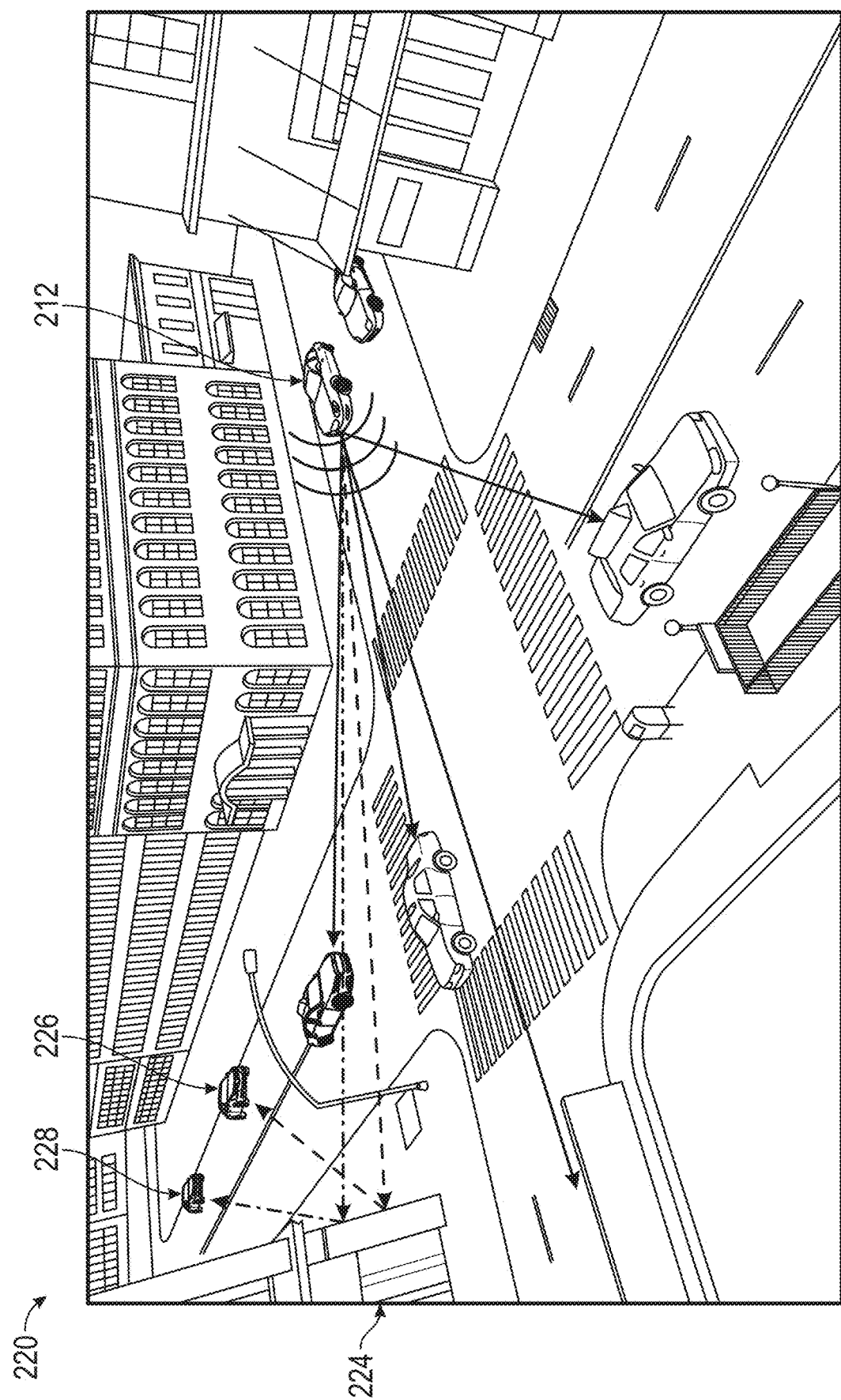
FIGS. 8 and 9 illustrate an environment having a vehicle with a radar system, according to various implementations of the subject technology.

FIG. 8 illustrates another situation 220, in a city street having a target vehicle with a radar system (not shown). The vehicle 212 has several direct paths to other moving vehicles, identified by the solid lines. The vehicle 212 also a has direct path to several stationary objects, in this situation 220 these are buildings 224. The transmission signal is reflected from the buildings 224 to identify other moving vehicles around the corner from the vehicle 212. By incorporating the reflection information, such as from an FMCW signal, the vehicle 212 can distinguish the buildings 224 from moving vehicle 226 and is also able to identify a parked vehicle 228. The reflection information provides this information for temporarily stationary objects as well. Rather than relying on GPS for every calculation and decision, the present disclosure provides a method to use the sounding signal to create a real time landscape of an environment.

Figure 9:
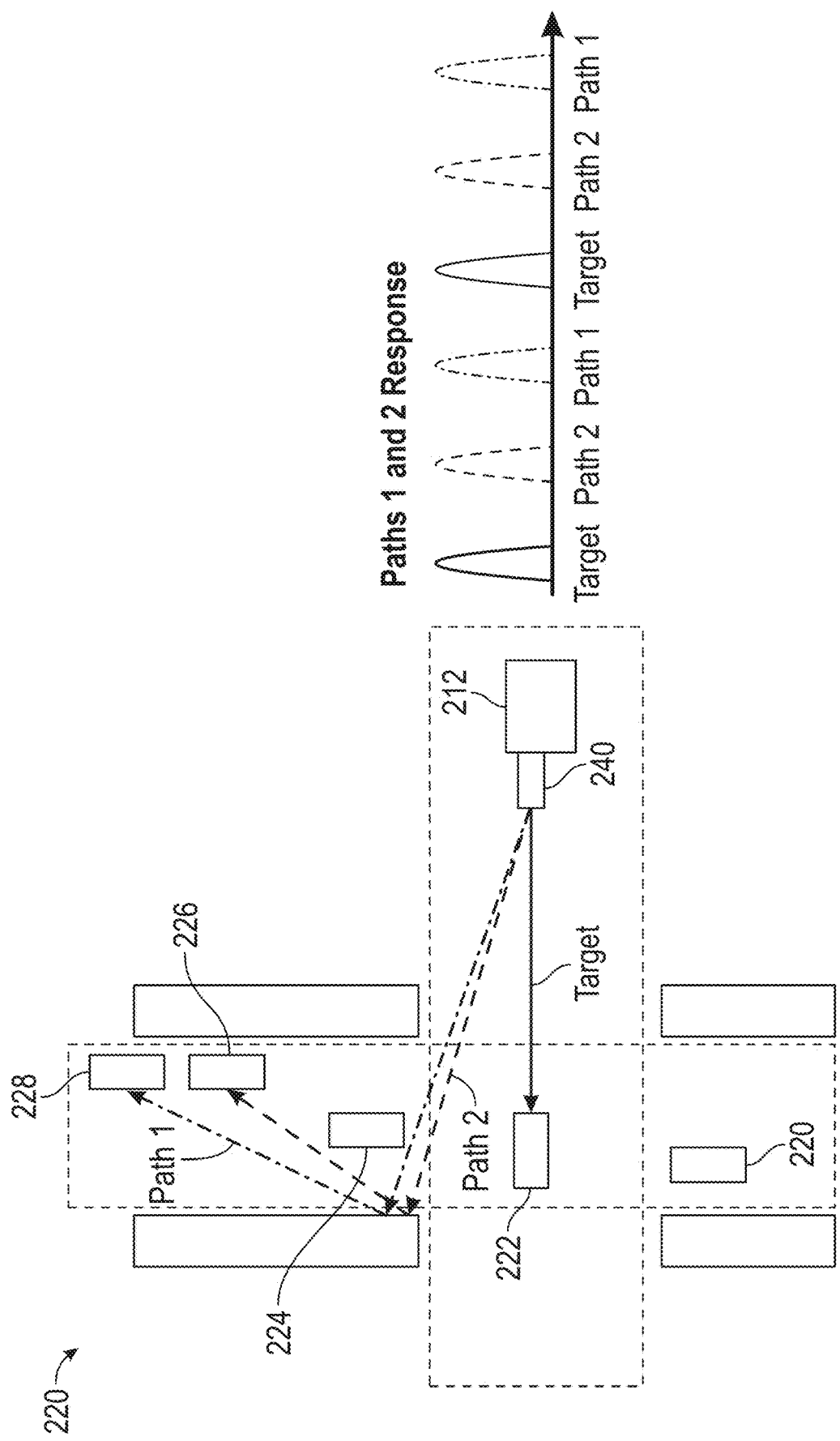

This is further illustrated in FIG. 9, wherein the vehicle 212 has radar system 240 for transmission of signals and object detection. The target path is indicated by the solid line to vehicle 222. There are other objects 226, 228. As the transmission beams are reflected from the building(s) 224, they create path 1 and path 2. The distance from the buildings(s) 224 to the objects 226, 228 creates differences in the reflection information to enable location determination. The responses of the sounding signal for path 1 and path 2 are illustrated with respect to the target reflections. As indicated, the target path takes the shortest amount of time for a roundtrip signal, and as the vehicles 212, 222 separate further the time increases. If the distance between the vehicles 212, 222 decreases, the time between target responses will decrease proportionally. The same timing changes happen with respect to the vehicle 212 and the building 224.

Figure 10:
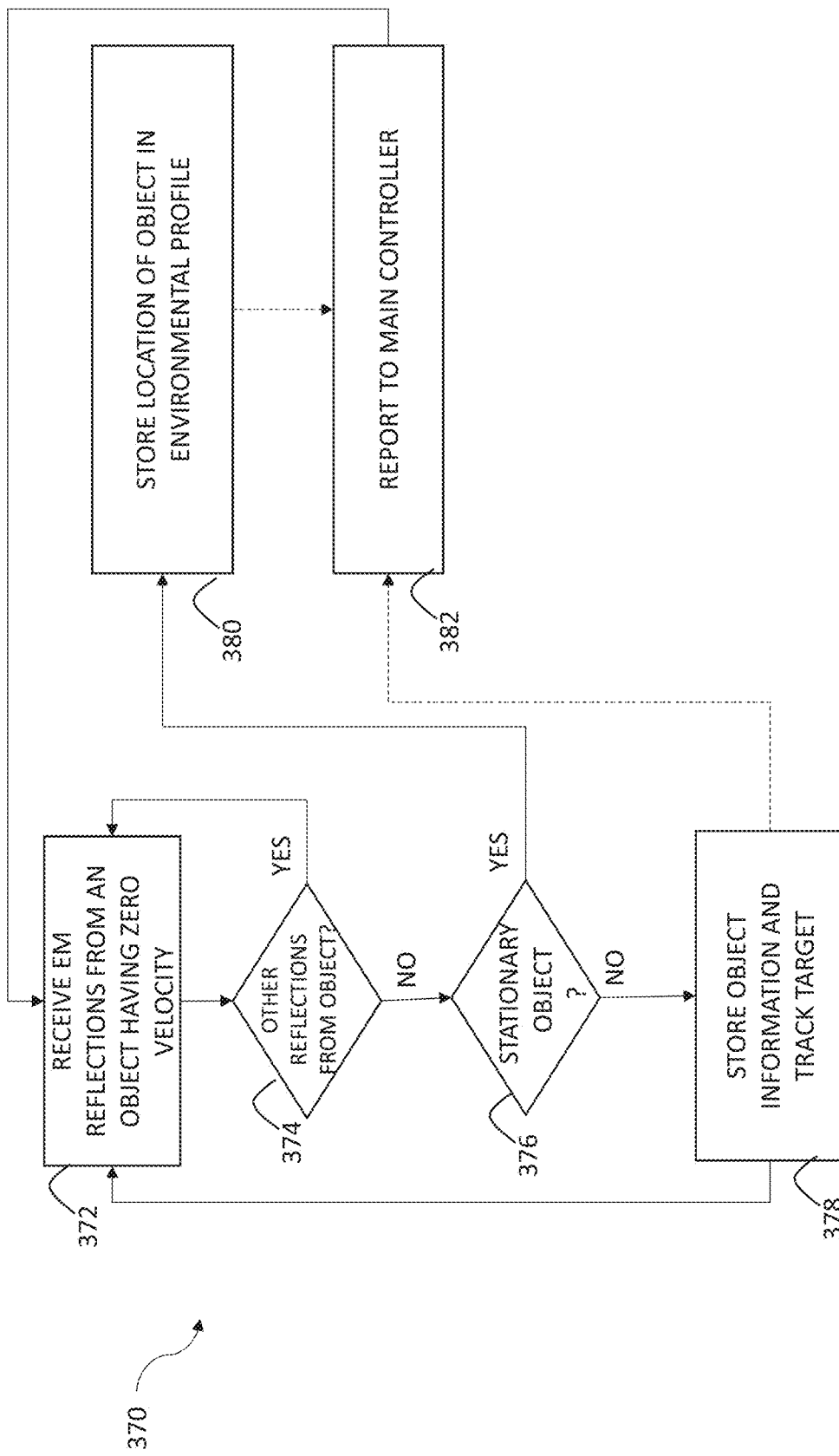
FIG. 10 illustrates a process for determining an environmental profile, according to various implementations of the subject technology.

FIG. 10 illustrates a process 370 for developing an environmental landscape of an environment, such as in real time. For explanatory purposes, the example process 370 is primarily described herein with reference to the radar system 20 of FIG. 1; however, the example process 370 is not limited to the radar system 20 of FIG. 1, and the example process 370 can be performed by one or more other components of the radar system 20 of FIG. 1. Further for explanatory purposes, the blocks of the example process 370 are described herein as occurring in series, or linearly. However, multiple blocks of the example process 370 can occur in parallel. In addition, the blocks of the example process 370 can be performed in a different order than the order shown and/or one or more of the blocks of the example process 370 may not be performed.

The process 370 begins at step 372, where the radar system 20 receives electromagnetic radiation, such as a reflection signal, from an object having zero velocity. Next, at step 374, the radar system 20 determines whether there are other reflections from the object. If there are other reflections from the object, the process 370 proceeds back to step 372 to process these reflections to form a set of reflections. Otherwise, the process 370 proceeds to step 376. At step 376, the radar system 20 determines whether the set of reflections indicates a stationary object. If the set of reflections indicate a stationary object, then the process 370 proceeds to step 380. Otherwise, the process 370 proceeds to step 378. In some implementations, the process 370 may optionally determine if the detected object is a mobile object that is not in motion, or if the detected object is a permanent stationary object based on the reflection set. At step 378, the object information is stored to track a moving target object. At step 380, the location of the stationary object is stored and the stored information is compiled to form an environmental landscape profile. Subsequently, at step 382, the landscape profile from step 380, as well as the tracking information from step 378, may be reported to a main controller, such as an antenna controller, system controller, sensor fusion and so forth.

Figure 11:
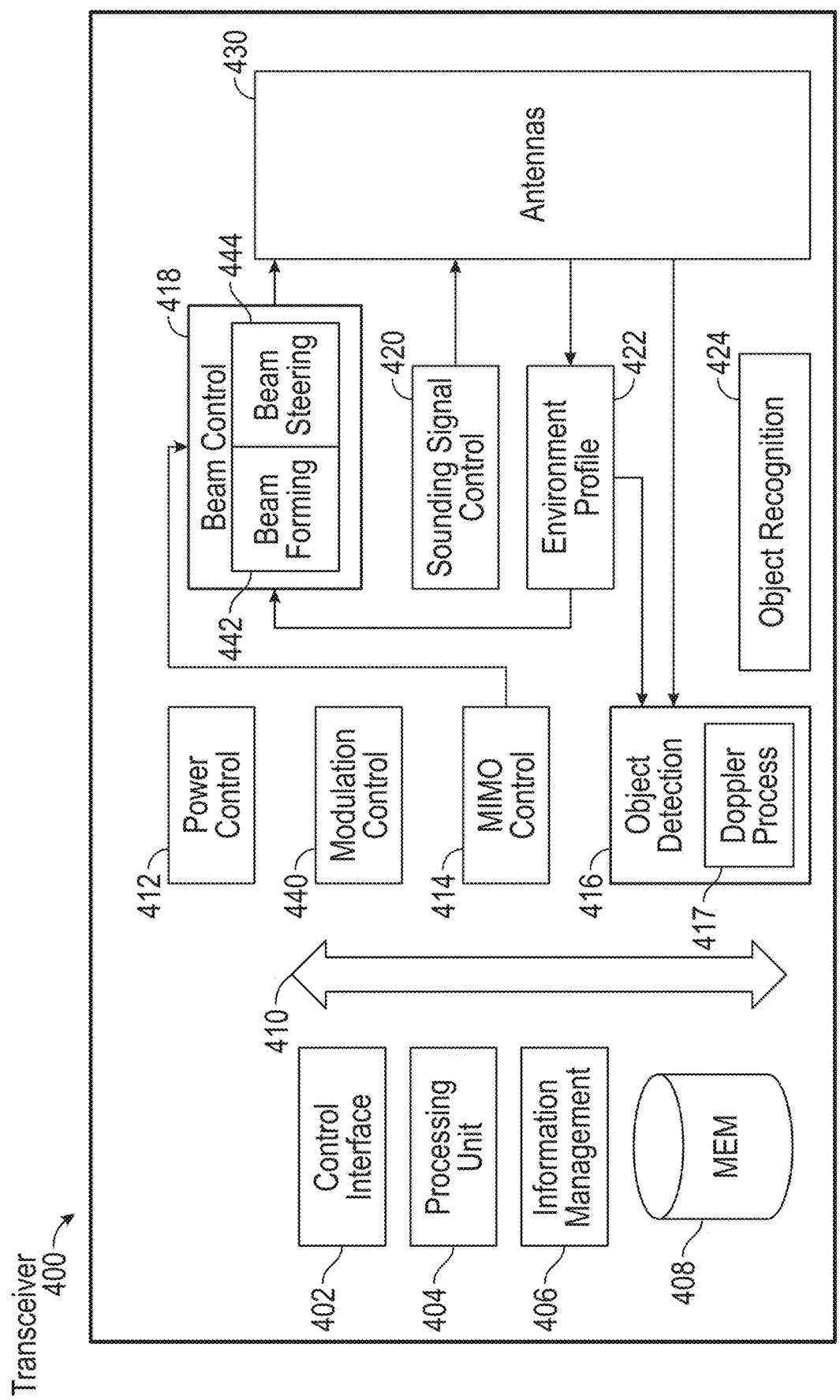
FIG. 11 illustrates a transceiver module, according to various implementations of the subject technology.

FIG. 11 illustrates a transceiver module, according to various implementations of the subject technology. A transceiver 400 adapted for radar operation, such as radar system 20. The transceiver 400 includes antennas 430 having beam control unit 418 for beam forming 442 and beam steering 444. A sounding signal control unit 420 is coupled to antennas 430. The information is processed to create an environment profile, 422. In operation, the antennas 430 are coupled to modulation control 440 and object detection module 416 having a doppler process unit 417 to extract reflection information from modulated signals. The transceiver 400 also includes a memory storage unit 408 for storing both volatile and involatile memory data. A processing unit 404 controls an information management unit 406 and control interface 402 for communication with other system controls, such as a sensor fusion in a vehicle. Communication within the transceiver 400 may be transmitted over bus 410. The antennas 430 are configured to scan an environment around a vehicle, in which reflected signals provide indications of positions and velocity, as well as other characteristics of objects. This creates a radar system for enabling the vehicle to understand its surroundings. The sounding signal is added to such a system to provide additional information and assist the vehicle system to create a real time landscape. There is further an object recognition unit 424 that receives the analog data from the antennas and/or the processed data of location, velocity and so forth, and determines an object type therefrom. In some implementations, the object recognition unit 424 includes a neural network (NN) processor, such as a convolutional NN (CNN) that trains on known data to match received data to images or object types. In some implementations, the object detection module 416 and the object recognition module 424 may be integrated in a perception module. The Doppler process unit 417 uses the received reflection from an object or target to determine a location, velocity and other parameters of the object. This may be done by use of an FMCW signal having a sawtooth, triangular or other wave form, as illustrated in FIG. 11.

Figure 12:
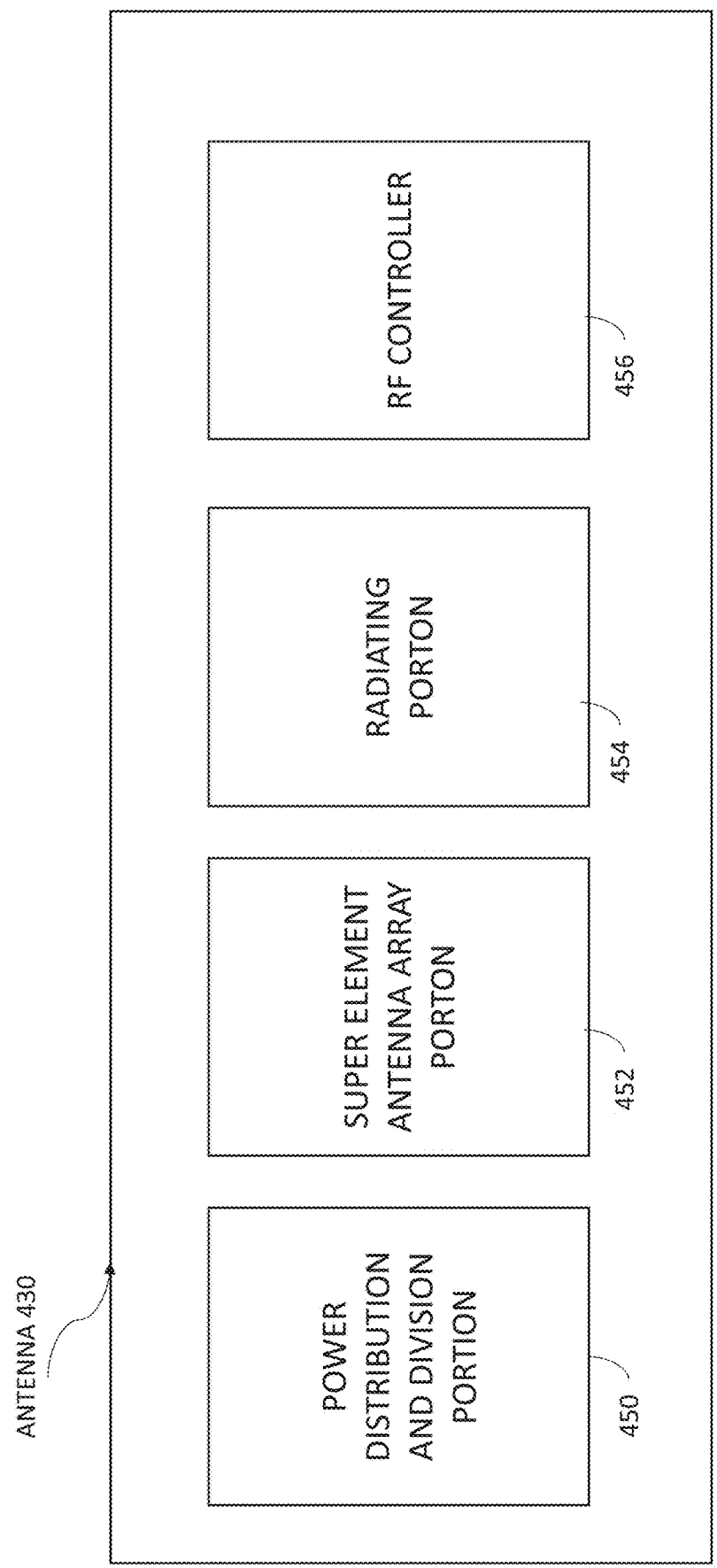
FIG. 12 illustrates an antenna module within the transceiver module of FIG. 11, according to various implementations of the subject technology.

FIG. 12 illustrates an antenna 430 within the transceiver module 400 of FIG. 11, according to various implementations of the subject technology. The radar system 20 of FIG. 1 works in collaboration with radiating elements in the antenna 430. As illustrated in FIG. 11, the antenna 430 includes a power distribution and division portion 450, a super element antenna array portion 452, a radiating portion 454 and RF controller 456. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The illustrated example of the antenna 430 is not meant to be limiting, but rather to provide a full example of the application of the present disclosure. The present disclosure describes the flexibility and robust design of the subject technology in antenna and radar design. The concepts described herein are also applicable to other systems and other antenna structures. The disclosure presented herein, along with variations thereof, may be used in communication systems or other applications that incorporate radiating elements and feed structures.

The super element antenna array portion 452 provides transmission paths for propagation of transmission signals. The RF controller 456 includes phase shifting elements and control circuitry for beam formation and beam-steering. The radiating portion may be an array of radiating elements, such as metamaterial elements. The RF controller 456 can control the generation and reception of electromagnetic radiation, or energy beams. The RF controller 456 determines the direction, power and other parameters of the beams and controls the antenna 430 to achieve beam steering in various directions. In some implementations, the RF controller 456 determines one or more portions of a radiation pattern of radiating elements in the radiating portion 454 in response to detection of an object, and determines a directivity of a transmission from radiating elements in the radiating portion 454 to increase gain of the transmission in a direction of the object based on the one or more portions of the radiation pattern. In some aspects, the one or more portions of the radiation pattern includes a first portion of the radiation pattern that corresponds to a main lobe, a second portion of the radiation pattern that corresponds to at least one side lobe and a third portion of the radiation pattern that corresponds to an overlapping area of the main lobe and the at least one side lobe. The antenna 430 also includes modules for control of reactance, phase and signal strength in a transmission line.

The present disclosure is described with respect to a radar system, where the antenna 430 is a structure having a feed structure, such as the power distribution and division portion 450, with an array of transmission lines feeding a radiating array, such as the radiating portion 454, through the super element antenna array portion 452. In some implementations, the super element antenna array portion 452 includes a plurality of transmission lines configured with discontinuities within the conductive material and the radiating portion 454 is a lattice structure of unit cell radiating elements proximate the transmission lines. The power distribution and division portion 450 may include a coupling module for providing an input signal to the transmission lines, or a portion of the transmission lines. In some implementations, the coupling module is a power divider circuit that divides the input signal among the plurality of transmission lines, in which the power may be distributed equally among the N transmission lines or may be distributed according to another scheme, such that the N transmission lines do not all receive a same signal strength.

In one or more implementations, the power distribution and division portion 450 incorporates a dielectric substrate to form a transmission path, such as a SIW. In this respect, the power distribution and division portion 450 may provide reactance control through integration with the transmission line, such as by insertion of a microstrip or strip line portion that couples to a reactance control mechanism (not shown). The power distribution and division portion 450 may enable control of the reactance of a fixed geometric transmission line. In some implementations, one or more reactance control mechanisms may be placed within a transmission line. Similarly, the reactance control mechanisms may be placed within multiple transmission lines to achieve a desired result. The reactance control mechanisms may have individual controls or may have a common control. In some implementations, a modification to a first reactance control mechanism is a function of a modification to a second reactance control mechanism.

In some implementations, the power distribution and division portion 450 may include the power divider circuit and a control circuit therefor. The control circuit includes the reactance control mechanisms, or reactance controller, such as a variable capacitor, to change the reactance of a transmission circuit and thereby control the characteristics of the signal propagating through the transmission line. The reactance control mechanisms can act to change the phase of a signal radiated through individual antenna elements of the radiating portion 454. Where there is such an interruption in the transmission line, a transition is made to maintain signal flow in the same direction. Similarly, the reactance control mechanisms may utilize a control signal, such as a Direct Current (DC) bias line or other control means, to enable the antenna 430 to control and adjust the reactance of the transmission line. In some implementations, the power distribution and division portion 450 includes one or more structures that isolate the control signal from the transmission signal. In the case of an antenna transmission structure, the reactance control mechanisms may serve as the isolation structure to isolate DC control signal(s) from Alternating Current (AC) transmission signals.

The transmission line may have various portions, in which a first portion receives a transmission signal as an input, such as from a coaxial cable or other supply structure, and the transmission signal traverses a substrate portion to divide the transmission signal through a corporate feed-style network resulting in multiple transmission lines that feed multiple super elements. Each super element includes a transmission line having a plurality of slots. The transmission signal radiates through these slots in the super elements of the super element antenna array portion 452 to the radiating portion 454, which includes an array of MTS elements positioned proximate the super elements. In some implementations, the array of MTS elements is overlaid on the super elements, however, a variety of configurations may be implemented. The super elements effectively feed the transmission signal to the array of MTS elements, from which the transmission signal radiates. Control of the array of MTS elements results in a directed signal or beamform.

As described in the present disclosure, a reactance control mechanism is incorporated to adjust the effective reactance of a transmission line and/or a radiating element fed by a transmission line. In some implementations, the reactance control mechanism includes a varactor that changes the phase of a signal. In other implementations, alternate control mechanisms are used. The reactance control mechanism may be, or include at least a portion of, a varactor diode having a bias voltage applied by a controller (not shown). The varactor diode may serve as a variable capacitor when a reverse bias voltage is applied. As used herein, the term "reverse bias voltage" is also referred to herein as "reactance control voltage" or "varactor voltage." The value of the reactance, which in this case is capacitance, is a function of the reverse bias voltage value. By changing the reactance control voltage, the capacitance of the varactor diode is changed over a given range of values. Alternate implementations may use alternate methods for changing the reactance, which may be electrically or mechanically controlled. In some implementations, the varactor diode also may be placed between conductive areas of a radiating element. With respect to the radiating element, changes in varactor voltage produce changes in the effective capacitance of the radiating element. The change in effective capacitance changes the behavior of the radiating element and in this way the varactor diode may be considered as a tuning element for the radiating elements in beam formation.

In some implementations, the radiating portion 454 is coupled to the sounding signal control unit 420 shown in FIG. 11. Referring back to FIG. 11, the sounding signal control unit 420 can generate the specific transmission signal, such as a FMCW signal, which is used as for radar sensor applications as the transmitted signal is modulated in frequency, or phase. The FMCW transmitter signal enables the radar system 20 to measure range to an object by measuring the phase differences in phase or frequency between the transmitted signal and the received signal, or reflected signal. Other modulation types may be incorporated according to the desired information and specifications of a system and application. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth. The received information is stored in the memory storage unit 408, in which the information structure may be determined by the type of transmission and modulation pattern. Other modulation schemes may be employed to achieve desired results. The sounding signal control unit 420 may generate a cellular modulated signal, such as an Orthogonal Frequency Division Multiplexing (OFDM) signal. The transmission feed structure may be used in a variety of systems. In some systems, the transmission signal is provided to the antenna 430, and the sounding signal control unit 420 may act as an interface, translator or modulation controller, or otherwise as required for the transmission signal to propagate through a transmission line network of the power distribution and division portion 450.

Continuing with FIG. 12, the antenna 430 includes the radiating portion 454, composed of individual radiating elements discussed herein. The radiating portion 454 may take a variety of forms and is designed to operate in coordination with the super element antenna array portion 452, in which individual radiating elements correspond to elements within the super element antenna array portion 452. As used herein, the "unit cell element" is referred to as an "MTS unit cell" or "MTS element," and these terms are used interchangeably throughout the present disclosure without departing from the scope of the subject technology. The MTS unit cells include a variety of conductive structures and patterns, such that a received transmission signal is radiated therefrom. The MTS unit cells may serve as an artificial material, meaning a material that is not naturally occurring. Each MTS unit cell has some unique properties. These properties include a negative permittivity and permeability resulting in a negative refractive index; these structures are commonly referred to as left-handed materials (LHMs). The use of LHMs enables behavior not achieved in classical structures and materials. The MTS array is a periodic arrangement of unit cells that are each smaller than the transmission wavelength. In some implementations, each of the unit cell elements has a uniform size and shape; however, alternate and other implementations may incorporate different sizes, shapes, configurations and array sizes.

As seen in the present disclosure, interesting effects may be observed in propagation of electromagnetic waves, or transmission signals. MTS elements can be used for several interesting devices in microwave and terahertz engineering such as antennas, sensors, matching networks, and reflectors, such as in telecommunications, automotive and vehicular, robotic, biomedical, satellite and other applications.

In some implementations, the power distribution and division portion 450 includes a capacitance control mechanism controlled by the RF controller 456 to control the phase of a transmission signal as it radiates from radiating portion 454. In some implementations, the RF controller 456 determines a voltage matrix to apply to the reactance control mechanisms within the power distribution and division portion 450 to achieve a given phase shift or other antenna parameters. In some implementations, the radiating portion 454 is adapted to transmit a directional beam without incorporating digital beam forming techniques, but rather through active control of the reactance parameters of the individual unit cell elements that make up the radiating portion 454.

In a radar implementation, the RF controller 456 receives information from within the antenna 430. Information may be provided from the antenna 430 to a sensor fusion module (not shown). This implementation depicts a vehicular control system, but is applicable in other fields and applications as well. In a vehicular control system, the sensor fusion module can receive information (digital and/or analog form) from multiple sensors and can interpret that information, making various inferences and initiating actions accordingly. One such action is to provide information to the RF controller 456, in which that information may be the sensor information or may be an instruction to respond to sensor information. The sensor information may provide details of an object detected by one or more sensors, including the object's range, velocity, acceleration, and so forth. The sensor fusion module may detect an object at a location and instruct the RF controller 456 to focus a beam on that location. The RF controller 456 then responds by controlling the transmission beam through the reactance control mechanisms and/or other control mechanisms for the antenna 430. The instruction from the RF controller 456 acts to control generation of radiation beams, in which a radiation beam may be specified by antenna parameters such as beam width, transmit angle, transmit direction and so forth.

In some implementations, the signal is received by each unit cell element of the radiating portion 454 and the phase of the radiating portion 454 is adjusted by the RF controller 456. In some implementations, transmission signals are received by a portion, or subarray, of the radiating portion 454. The radiating portion 454 may be applicable to many applications, including radar and cellular antennas. The subject technology considers an application in autonomous vehicles, such as an on-board sensor to detect objects in the environment of the vehicle. Alternate implementations may use the subject technology for wireless communications, medical equipment, sensing, monitoring, and so forth. Each application type incorporates designs and configurations of the elements, structures and modules described herein to accommodate their needs and goals.

In the antenna 430, a signal is specified by the RF controller 456, which may be in response to prior signals processed by an Artificial Intelligence (AI) module that is communicably coupled to the antenna 430. In other implementations, the signal may be based on program information from the memory storage unit 408. There are a variety of considerations to determine the beam formation, in which this information is provided to the RF controller 456 to configure the various unit cell elements 408 of the radiating portion 454.

When the transmission signal is provided to the antenna 430, such as through a coaxial cable or other connector, the transmission signal propagates through the power distribution and division portion 450 to the super element antenna array portion 452 through which the transmission signal radiates to the radiating portion 454 for transmission through the air. As depicted in FIG. 12, the super element antenna array portion 452 and the radiating portion 454 are arranged side-by-side, however, the physical arrangement of the radiating portion 454 relative to the super element antenna array portion 452 may be different depending on implementation.

The implementation illustrated in FIG. 12 enables phase shifting of radiating signals from radiating portion 454. This enables a radar unit to scan a large area with the radiating portion 454. For vehicle applications, sensors seek to scan the entire environment of the vehicle. These then may enable the vehicle to operate autonomously, or may provide driver assist functionality, including warnings and indicators to the driver, and controls to the vehicle. The subject technology in the present disclosure is a dramatic contrast to the traditional complex systems incorporating multiple antennas controlled by digital beam forming. The subject technology increases the speed and flexibility of conventional systems, while reducing the footprint and expanding performance.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A sounding signal system, comprising:
    an antenna configured to transmit a sounding signal into an environment; and
    an antenna controller coupled to the antenna and configured to:
        control beam forming and beam steering of the antenna for a determined direction;
        initiate transmission of the sounding signal in the determined direction;
        detect a first reflection of the sounding signal from a first reflection point in the environment;
        determine a location of the first reflection point from the reflection of the sounding signal at a first time;
        determine the first reflection point is within a direct line of sight from the antenna;
        detect a second reflection of the sounding signal from a second reflection point at a second time after the first time;
        determine the second reflection point is not within the direct line of sight from the antenna;
        store the first and second reflections as a reflection set associated with the sounding signal transmitted at a first transmission time; and
        determine a location of at least one object as a function of comparing multiple reflection sets, wherein the first reflection point deflects the sounding signal to the second reflection point.

2. The sounding signal system of claim 1, wherein the antenna controller is further configured to identify a stationary object as having a zero velocity value.

3. The sounding signal system of claim 2, wherein the antenna controller is further configured to store information of a plurality of reflection sets in memory.

4. The sounding signal system of claim 3, wherein the antenna controller is further configured to compare the information of the plurality of reflection sets to track detected objects.

5. The sounding signal system of claim 4, wherein the antenna controller is further configured to create a real time landscape of the environment.

6. The sounding signal system of claim 1, wherein the sounding signal system is part of a vehicular control system and the sounding signal is transmitted from a radar module.

7. The sounding signal system of claim 1, wherein the environmental landscape profile identifies a location of a stationary object in an environment.

8. The sounding signal system of claim 1, wherein the antenna controller is further configured to:
    receive analog data from the antenna;
    perform an object recognition from the analog data, the object recognition including identification of the location, a velocity or a type of object detected.

9. A method for a sounding signal, comprising:
    configuring an antenna to transmit a sounding signal into an environment;
    controlling beam forming and beam steering of the antenna for a determined direction;
    transmitting the sounding signal in the determined direction;
    detecting a first reflection of the sounding signal from a first reflection point in the environment;

determining a location of the first reflection point from the reflection of the sounding signal at a first time;

determining the first reflection point is within a direct line of sight from the antenna;

detecting a second reflection of the sounding signal from a second reflection point at a second time after the first time;

determining the second reflection point is not within the direct line of sight from the antenna;

storing the first and second reflections as a reflection set associated with the sounding signal transmitted at a first transmission time; and determining a location of at least one object as a function of comparing multiple reflection sets, wherein the first reflection point deflects the sounding signal to the second reflection point.

10. The method of claim 9, further comprising distinguishing between a plurality of objects, and wherein the sounding signal is a frequency modulated continuous wave signal.

11. The method of claim 10, wherein the set of reflections from the plurality of objects have approximately a same angle of arrival, and wherein the method further comprises compiling individual reflection times from the set of reflections.

12. The method of claim 11, wherein the sounding signal has a boresight direction of a main reference beam and side lobe beams having angles having angular directions with respect to the boresight direction, wherein the boresight is the line of sight to a first object and the angles are directed at other objects in the environment.

13. The method of claim 12, wherein at least one object is in a non-line of sight area.

14. The method of claim 13, further comprising scanning the sounding signal over an angular range based at least on different phase shifts applied to the reference signal.

15. The method of claim 14, wherein the sounding signal is transmitted from a vehicle and the method further comprises:

identifying a path of the vehicle; and identifying one or more other objects in the path of the vehicle as a moving target object or a stationary target object.

16. The method of claim 15, further comprising:

generating a landscape layout of the vehicle to the first object based on the set of reflections; and identifying objects in a path of the vehicle from the landscape layout.

17. The method of claim 16, wherein the landscape layout is generated in real time.

18. A processing system, comprising:

a memory storage unit; and at least one processing unit configured to:

control beam forming and beam steering of the antenna for a determined direction;

initiate transmission of the sounding signal in the determined direction;

detect a first reflection of the sounding signal from a first reflection point in the environment;

determine a location of the first reflection point from the reflection of the sounding signal at a first time;

determine the first reflection point is within a direct line of sight from the antenna;

detect a second reflection of the sounding signal from a second reflection point at a second time after the first time;

determine the second reflection point is not within the direct line of sight from the antenna;

store the first and second reflections as a reflection set associated with the sounding signal transmitted at a first transmission time; and determine a location of at least one object as a function of comparing multiple reflection sets wherein the first reflection point deflects the sounding signal to the second reflection point.

19. The processing system of claim 18, wherein the sounding signal comprises a frequency modulated continuous wave signal.

* * * * *